(12) United States Patent
Kim et al.

(10) Patent No.: US 7,484,231 B2
(45) Date of Patent: Jan. 27, 2009

(54) HIGH-DENSITY DISK RECORDING MEDIUM HAVING AN ASYMMETRICALLY-SHAPED CENTER HOLE AND MANUFACTURING METHOD THEREOF

(75) Inventors: Jin Yong Kim, Kyunggi-do (KR); Kyung Chan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 741 days.

(21) Appl. No.: 10/145,391

(22) Filed: May 13, 2002

(65) Prior Publication Data

US 2002/0181387 A1 Dec. 5, 2002

(30) Foreign Application Priority Data

May 14, 2001 (KR) ................................ 2001-26249
Jul. 14, 2001 (KR) ................................ 2001-42649

(51) Int. Cl.
*G11B 17/028* (2006.01)
(52) U.S. Cl. ..................................................... 720/697
(58) Field of Classification Search ................. 720/697
See application file for complete search history.

(56) References Cited

U.S. PATENT DOCUMENTS

| 4,954,065 A | | 9/1990 | Shindo et al. | |
|---|---|---|---|---|
| 5,504,735 A | * | 4/1996 | Ota et al. | 369/282 |
| 5,572,509 A | * | 11/1996 | Kobayashi et al. | 369/290 |
| 5,590,115 A | * | 12/1996 | Kubo | 369/290 |
| 5,862,120 A | * | 1/1999 | Mukawa | 369/270 |
| 6,049,522 A | * | 4/2000 | Mori et al. | 369/282 |
| 6,212,159 B1 | * | 4/2001 | Mori et al. | 369/282 |
| 6,351,449 B1 | * | 2/2002 | Takemoto et al. | 369/275.4 |
| 6,495,235 B2 | * | 12/2002 | Uchida et al. | 428/64.1 |

FOREIGN PATENT DOCUMENTS

| EP | 0 284 387 A2 | 9/1988 |
|---|---|---|
| EP | 1 152 407 A2 | 11/2001 |
| EP | 1 258 873 A3 | 8/2004 |
| JP | 61051632 | 3/1986 |
| JP | 09-320159 | 5/1996 |
| JP | 10-283683 | 10/1998 |
| KR | 10-2001-0098871 | 11/2001 |

OTHER PUBLICATIONS

IBM Technical Disclosure Bulletin; "Frustrum-Shaped Optical Disk and Mating Receptacle" vol. 37 No. 11 Nov. 1994; p. 529.

* cited by examiner

*Primary Examiner*—Mark Blouin
(74) *Attorney, Agent, or Firm*—Lee, Hong, Degerman, Kang & Schmadeka

(57) ABSTRACT

The present invention relates to a high-density disk that is structured to prevent a collision of an optical pickup's objective lens with the high-density disk if the disk is placed upside down in a disk device that is able to record and reproduce signals to/from the high-density disk. A high-density disk recording medium according to the present invention is structured such that, wherein a recording layer having high-density pit patterns is offset from a center plane of disk thickness, a center hole of the disk recording medium is asymmetric in shape with respect to the center plane where, for example, both entrances of the center hole have mutually different diameters.

26 Claims, 10 Drawing Sheets

HIGH-DENSITY DISK RECORDING MEDIUM HAVING AN ASYMMETRICALLY-SHAPED CENTER HOLE AND MANUFACTURING METHOD THEREOF

CROSS REFERENCE TO RELATED ART

This application claims the benefit of Korean Patent Application Nos. 2001-26249 and 2001-42649, filed on May 14, 2001, and Jul. 14, 2001, respectively, which are hereby incorporated by reference in their entirety.

BACKGROUND OF THE INVENTION

1. Field of the Invention

The present invention generally relates to a high-density disk structure and the manufacturing method thereof, and more particularly, a high-density disk structure that prevents the collision of an optical pickup's objective lens with a high-density disk.

2. Description of the Related Art

Figure 1:
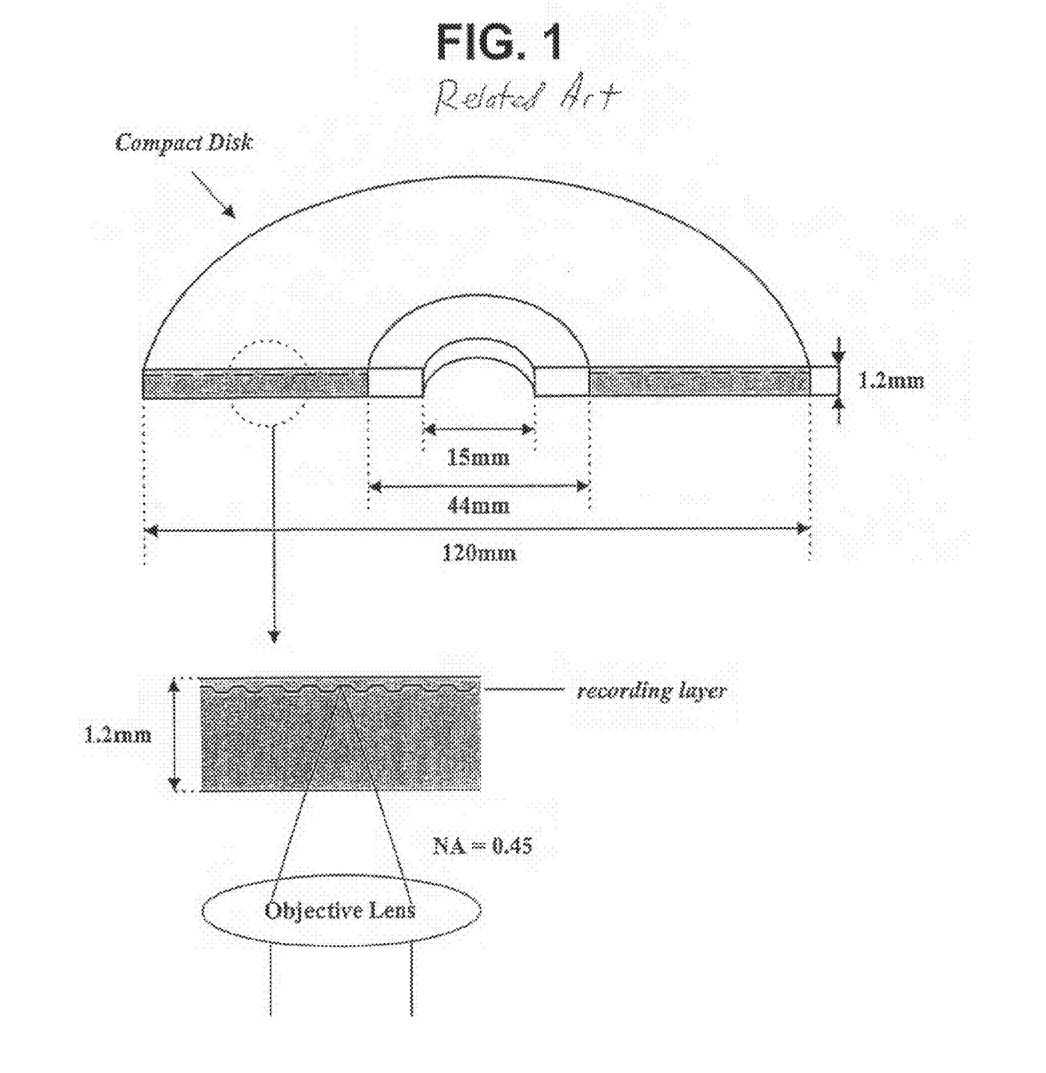
FIG. 1 shows the structure of a conventional compact disk (CD)

A compact disk (CD) is 1.2 mm in thickness and 120 mm in diameter as shown in FIG. 1. A CD has a center hole of 15 mm diameter and a clamping zone of 44 mm, which encircles the center hole. The clamping zone is an area where the CD is clamped by a damper on a spindle or a turntable installed in a disk device.

When a CD is normally placed into a disk device equipped with an optical pickup, its recording layer, which has pit patterns, is approximately 1.2 mm from an objective lens of the optical pickup. The objective lens for a CD has a numerical aperture (NA) of 0.45, which is relatively small.

Figure 2:
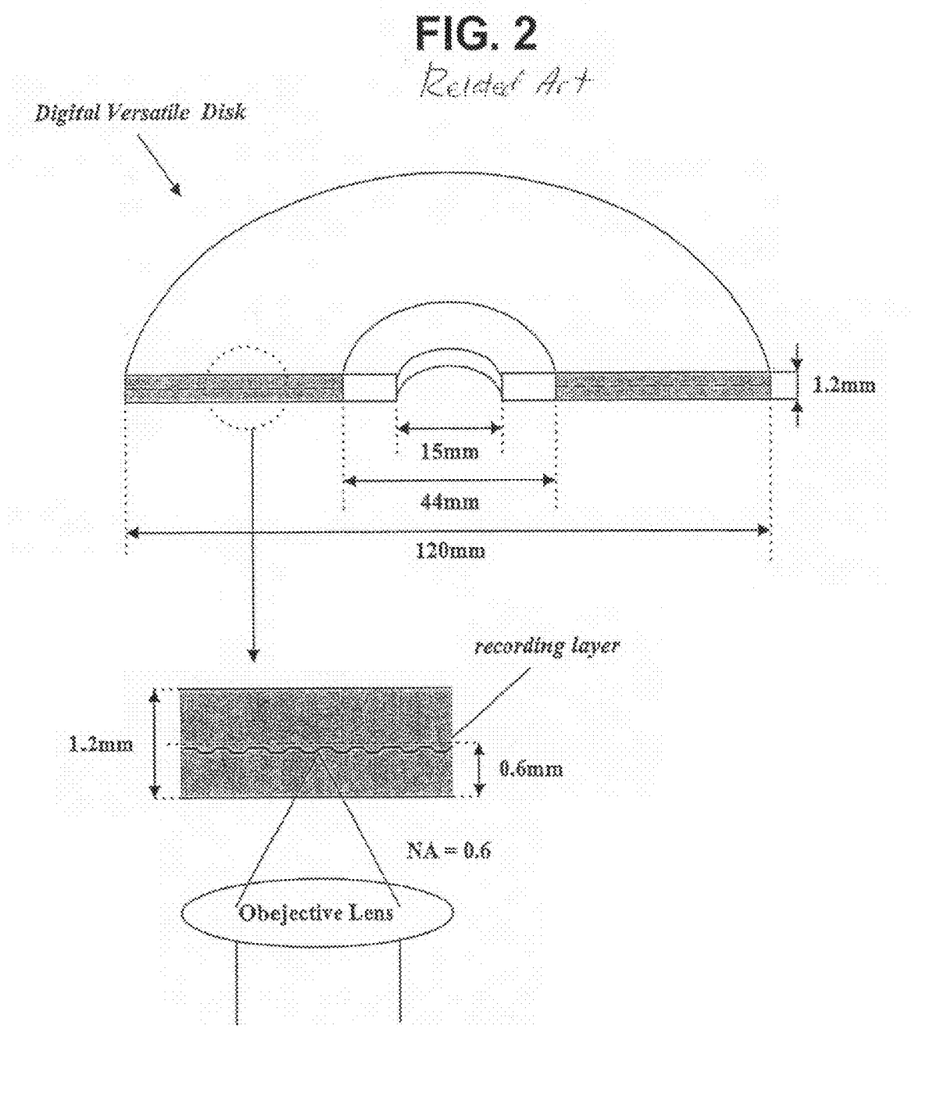
FIG. 2 shows the structure of a conventional digital versatile disk (DVD)

A digital versatile disk (DVD) is, similar to a CD, 1.2 mm in thickness and 120 mm in diameter, as shown in FIG. 2. A DVD also has a center hole of 15 mm diameter and a clamping zone of 44 mm encircling the center hole.

When a DVD is normally placed into a disk device, its recording layer, which has pit patterns, is approximately 0.6 mm from an objective lens of an optical pickup that a disk device is equipped with. The objective lens for a DVD has a NA of 0.6, which is relatively large.

Figure 3:
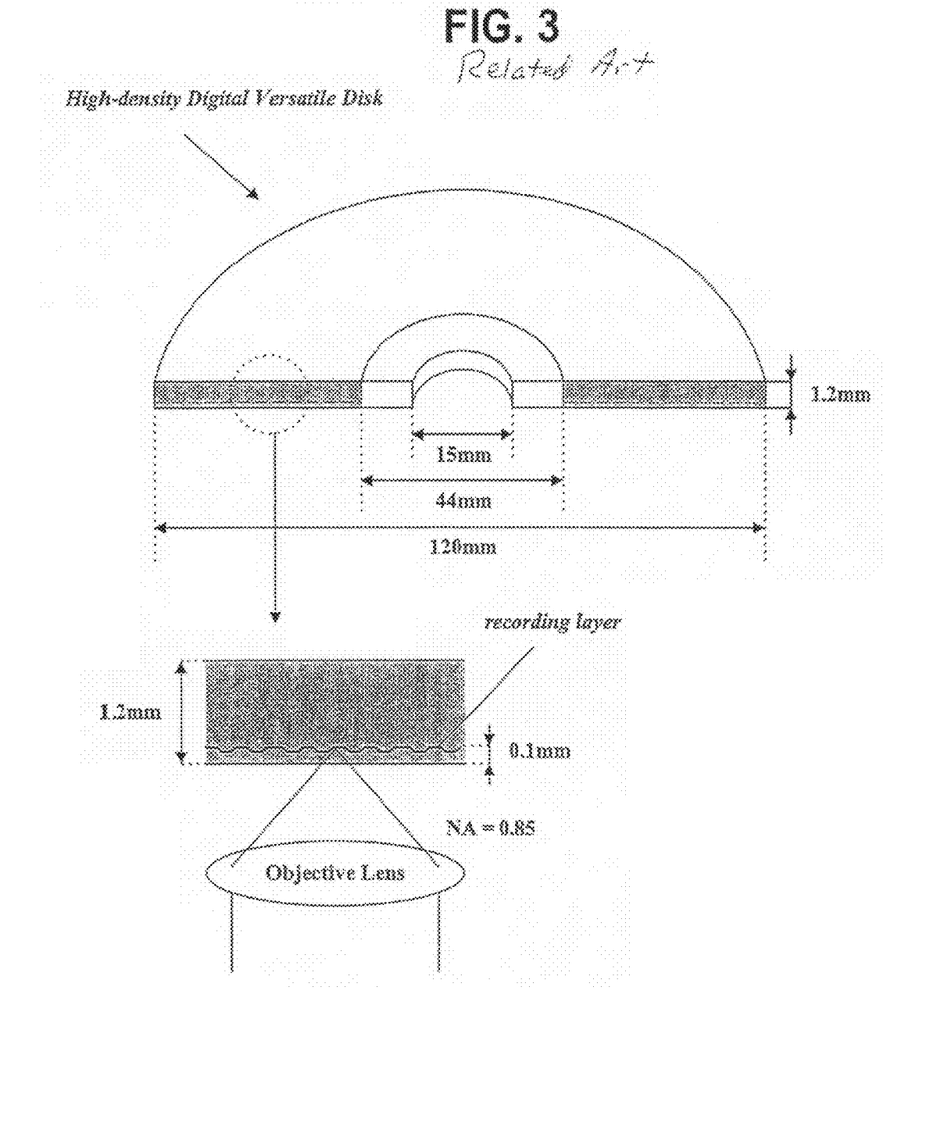
FIG. 3 shows the structure of a conventional high-density DVD (HD-DVD)

A high density-DVD (HD-DVD), which is currently being commercialized, is 1.2 mm in thickness and 120 mm in diameter and is shown in FIG. 3. A HD-DVD also has a center hole of 15 mm diameter and a clamping zone of 44 mm encircling the center hole. If a HD-DVD is normally placed into a disk device, there will be a 0.1 mm gap between its recording layer, which has pit patterns, and the objective lens of an optical pickup for a HD-DVD device. The objective lens of the optical pickup of an HD-DVD device has the largest NA of 0.85 with respect to the two other disk type devices. The optical pickup for a HD-DVD uses a laser beam of shorter wavelength than for a CD or a DVD to record or reproduce signals in high density.

Therefore, in comparison with a CD or a DVD, a HD-DVD uses an objective lens that is situated closer to the recording layer, that uses a laser beam of shorter wavelength, and that has a greater NA. According to these conditions, it is possible to concentrate a stronger intensity of light on a smaller beam spot formed on the high-density pit patterns of the recording layer of the HD-DVD. Consequently, the transmitting distance of a laser beam of shorter wavelength is shortened, and the variation of the laser beam and its spherical aberration are minimized.

Figure 4:
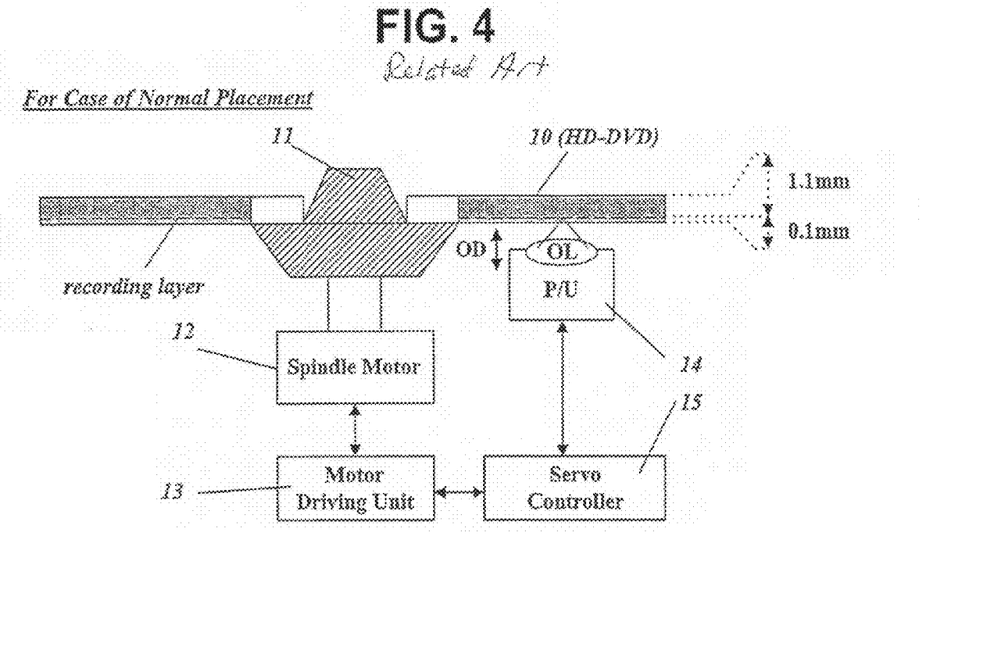
FIGS. 4 and 5 show normal placement and misplacement of a conventional high-density DVD, respectively.

Referring to FIG. 4, if a HD-DVD 10 is normally placed onto a spindle 11 of a turntable installed in a disk device, a conventional servo-controlling operation for a spindle motor 12 by a motor driving unit 13 and a servo controller 15 is conducted to rotate the placed HD-DVD 10 at a constant and high speed. While the HD-DVD 10 is rotating, a focusing-servo operation is conducted to focus a laser beam for an optical pickup 14 exactly onto the recording layer. This operation is performed by moving the objective lens OL of the optical pickup 14 in an up and down direction within an operating distance OD. If a laser beam is exactly in focus, then reproduction (or recording) of high-density pit patterns can be accomplished.

Figure 5:
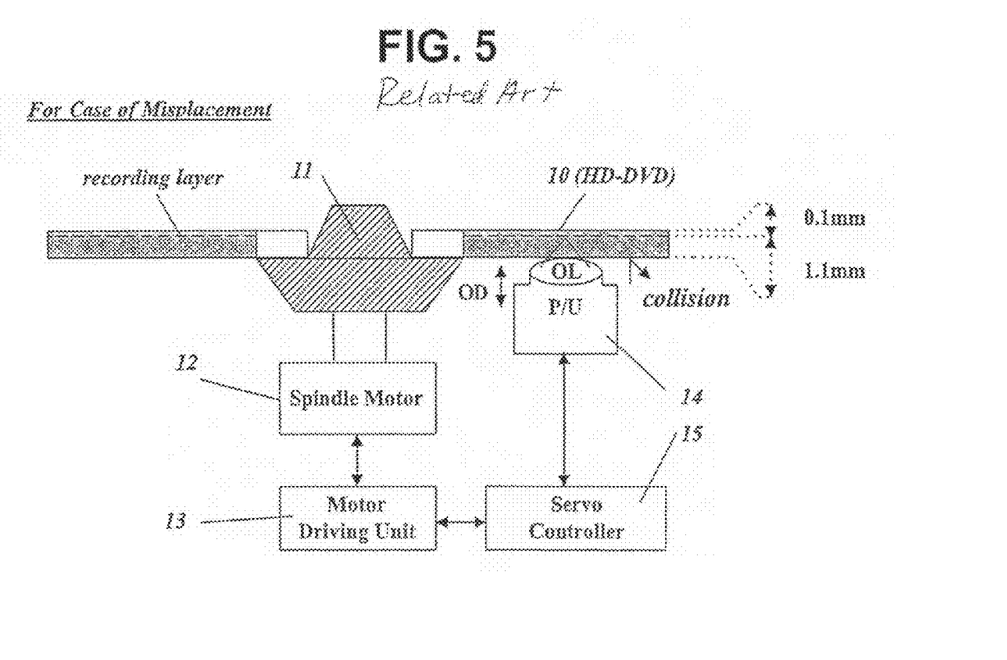

However, when the HD-DVD 10 is misplaced onto the spindle 11 by, for example, being placed upside down as shown in FIG. 5, the HD-DVD 10 will still be rotated at a constant and high speed by the combined servo-controlling operation by the turntable motor 12, the motor driving unit 13, and the servo controller 15. However, if the HD-DVD 10 has been placed upside down, the gap between the recording layer and the objective lens OL of the optical pickup 14 is 1.1 mm greater in comparison with a normally-placed HD-DVD.

In this misplacement, a laser beam cannot be focused within the conventional operating distance of the objective lens OL of the pickup 14. Therefore, the servo controller 15 supervising the focusing-servo operation continues to move the objective lens OL upward to the maximum movable distance "OD_Max" until the laser beam is correctly focused. However, in this case, the objective lens OL will collide with the misplaced HD-DVD 10. Consequently, the HD-DVD 10, the objective lens OL, and/or the servo-mechanism could be irreparably damaged.

SUMMARY OF THE INVENTION

Accordingly it is an object of the present invention to provide a high-density disk that is structured to prevent the collision between an objective lens of an optical pickup and the high-density disk as the objective lens moves upward to the maximum movable distance to be focused.

It is another object of the present invention to enable the detection of a misplaced high-density disk and to provide a signal as no disk state through a conventional focusing operation in the event that the high-density disk has been placed upside down.

It is another object of the present invention to provide a method of manufacturing a high-density disk that is structured to prevent the collision of an objective lens of an optical pickup and a misplaced high-density disk.

To achieve these and other advantages and in accordance with the purpose of the present invention, as embodied and broadly described, a medium for storing data is characterized as disk having first and second surfaces, the disk including a recording area and a clamping area and defining a center hole for receiving a spindle therein, wherein the center hole includes corresponding first and second inner diameter, an inner wall having a length, and a center. Also, there is a recording layer coplanarly disposed in the disk, wherein the recording layer is in closer proximity to the second surface of the disk, and the center hole is asymmetrically shaped with respect to a coplanar center plane of the recording medium so that the disk is raised from the spindle when the disk is inserted by placing the first surface of the disk onto the spindle first. The medium may be used with pre-recorded data, such as movies, or may also be used in the recordable format for recording data thereon.

According to one aspect of the present invention, the inner wall of the center hole is inclined at an angle equivalent to an angle of inclination of the spindle such that the second inner diameter is equal to the sum of the first inner diameter and the product of 2 multiplied by the length of the inner wall multiplied by the tangent of the angle of inclination.

According to another aspect of the present invention, a portion of the inner wall having a length closer in proximity to the second surface is inclined at an angle towards the center of the center hole and the remaining portion is parallel to a plane perpendicular to the plane of the recording medium. Consequently, the portion of the inner wall of the center hole closer in proximity to the second surface is inclined at an angle equivalent to an angle of inclination of the spindle such that the second inner diameter is equal to the sum of the first inner diameter and the product of 2 multiplied by the length of the inclined portion of the inner wall multiplied by the tangent of the angle of inclination.

According to another aspect of the present invention, a portion of the inner wall having a length and closer in proximity to the first surface protrudes horizontally toward the center of the center hole such that the inner wall of the center hole is stepped at least once.

A disk manufacturing method in accordance with the present invention is characterized in that it comprises preparing a metal master on which pit patterns of recorded signals are formed; making at least one stamper having a surface by using the metal master while copying the pit patterns of the metal master inversely onto the surface of the stamper; fixing the stamper firmly to an injection molding machine of which one plate has a hole forming member at its center, the hole forming member having upper and lower diameters and being shaped such that a center hole of a disk medium to be manufactured is in a symmetrical shape with respect to a coplanar center plane of the disk medium; injecting disk material of high temperature into the injection molding machine; and drawing out a disk medium from the injection molding machine.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

With reference to the drawings, the embodiments incorporating the principles, features and concepts of the present invention will be described.

Figure 6:
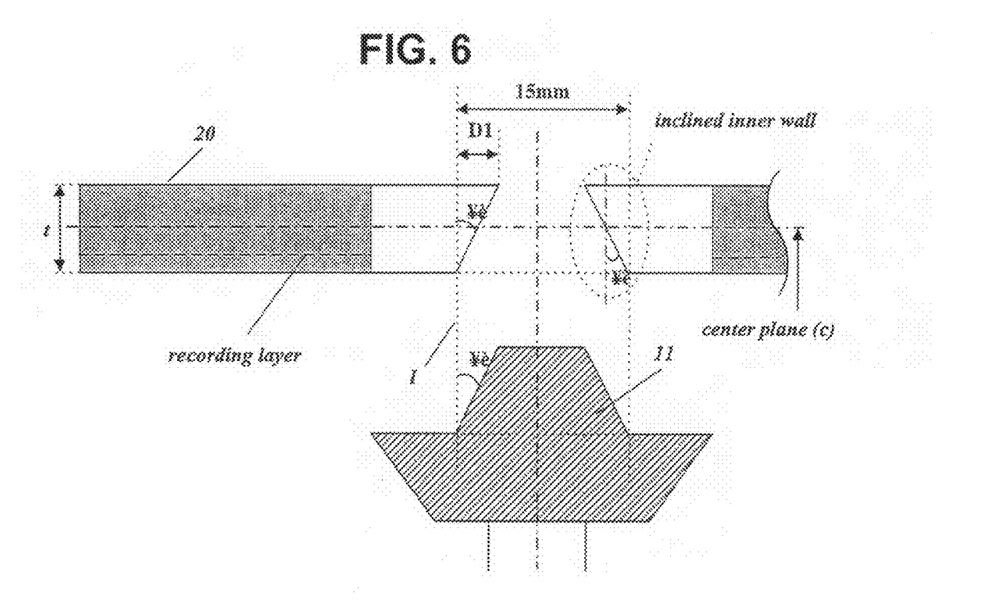
FIG. 6 is a sectional view of the first embodiment of, for example, a high-density disk structured according to the present invention.

FIG. 6 is a sectional view of the first preferred embodiment of a high-density disk structured according to the present invention. The embodiment of a high-density disk, for example, a HD-DVD according to the present invention has same dimension as a conventional HD-DVD depicted in FIG. 3, namely, 1.2 mm in thickness and 120 mm in diameter, a center hole of maximum 15 mm diameter and a clamping zone (or clamping area) of 44 mm diameter encircling the center hole. In addition, when the present HD-DVD 20 of FIG. 6 is normally placed into a disk device, its recording layer, which contains pit patterns, would be at least approximately 0.1 mm from the objective lens of an optical pickup as mentioned before.

However, the present invention HD-DVD 20 in FIG. 6 has a clamping zone structured such that its center hole is in asymmetric shape with respect to an imaginary horizontal center plane "c." The inner wall of the center hole is inclined at an angle "θ" with respect to a vertical line "l." For example, the inner diameter of the center hole decreases from bottom (the side in which the recording layer is disposed), where it is a maximum 15 mm, to top (the side opposite to which the recording layer is disposed in), where the minimum inner diameter is equal to [15 mm −2(D1)]. The distance "D1" is equal to [t(tanθ)] and "t" is the thickness of the HD-DVD.

The inclined angle θ preferably ranges from 30 to 60 degrees. The spindle 11 of the turntable in a disk device, which the HD-DVD 20 is placed onto, is structured such that its outer wall is also inclined at the same angle θ as shown in FIG. 6.

Figure 7:
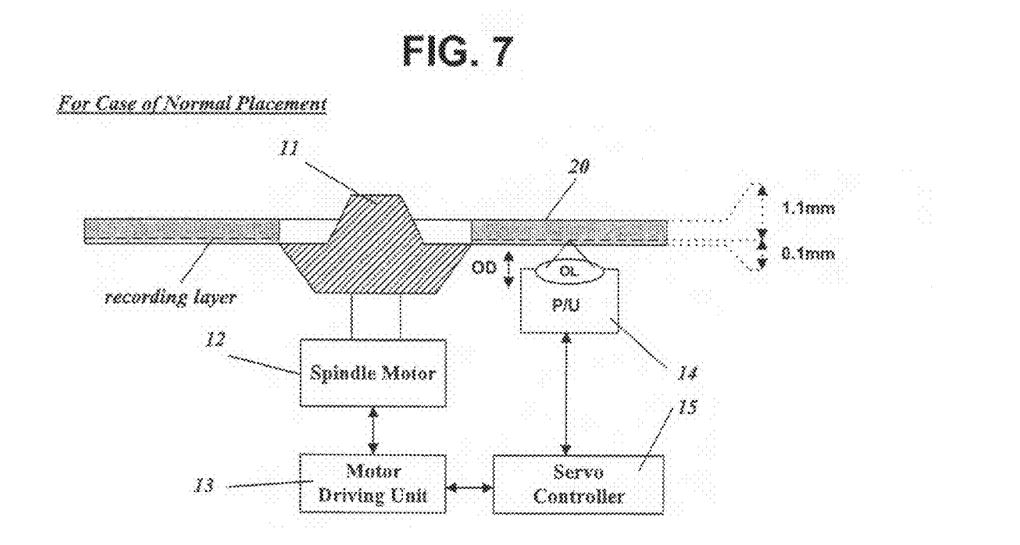
FIGS. 7 and 8 show normal placement and misplacement, respectively, of the first embodiment of a high-density disk structured according to the present invention.

If the disk 20 structured as above is placed normally onto the spindle 11 of a turntable in a disk device as shown in FIG. 7, the spindle 11 with an inclined outer wall of the turntable is in uniform contact with the center hole with an inclined inner wall. Consequently, the disk 20 is normally clamped the same as a conventional disk.

After successful clamping of the high-density disk 20, a conventional servo-controlling operation, characterized by the operation of the turntable motor 12, the motor driving unit 13 and the servo controller 15, is conducted to rotate the right-clamped disk 20 at a constant and high speed. Subsequently, a focusing-servo operation is conducted to focus a laser beam exactly onto a recording layer by moving the objective lens OL of the optical pickup 14 up and down within the operating distance OD. Once the laser beam is exactly focused, reproduction (or recording) of the high-density pit patterns begins.

Figure 8:
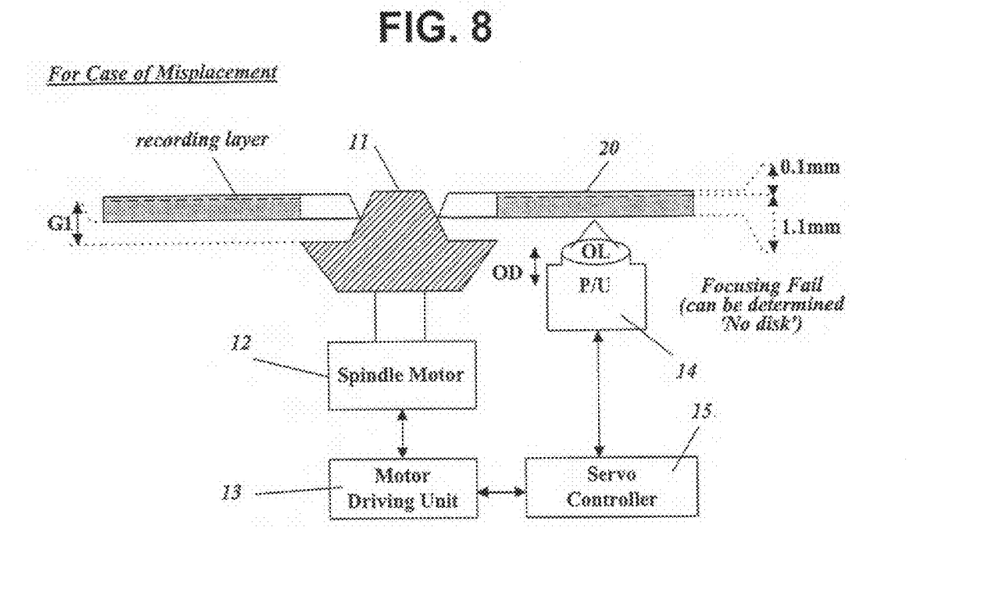

However, if the present disk 20 is placed upside down onto the spindle 11 of the turntable 11 as shown in FIG. 8, contact between the spindle 11 and the disk 20 only occurs where the center hole of the disk 20 is of the smallest diameter, [15 mm−2(D1)]. The disk 20 is therefore supported by the spindle 11 at about middle height of the spindle 11. In other words, there is no uniform contact between the spindle 11 and the disk 20 throughout the thickness t of the disk 20 since the spindle 11 is not fully inserted into the center hole of the present disk 20. Consequently, the surface of the disk 20 is raised by the gap G1 over normal placement.

Therefore, although the objective lens OL of the optical pickup 14 moves up to the maximum distance to acquire the exact focus while the misplaced disk 20 is rotating at a high speed, the objective lens OL will not collide with the surface of the misplaced disk 20, due to the marginal gap G1. Furthermore, because the recording layer, and the high-density pit patterns contained within, is also further apart from the objective lens OL than in normal placement, the focusing operation will fail. As a result, the misplacement of the disk would be judged as "no disk". Because a judgment of "no disk" ceases the focusing operation, a collision between the objective lens OL and the disk 20 is avoided.

Figure 9:
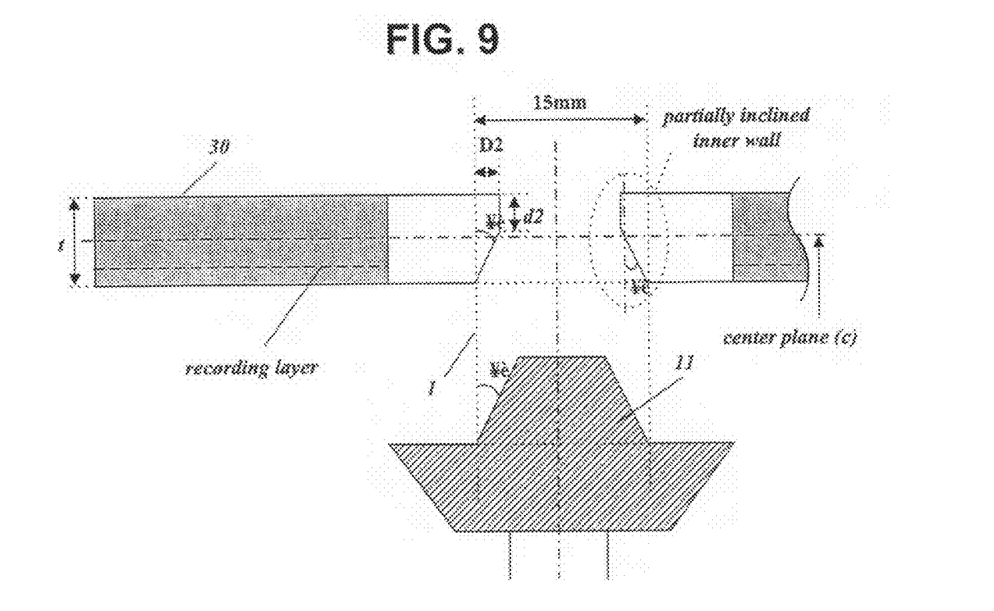
FIG. 9 is a sectional view of the second embodiment of, for example, a high-density disk structured according to the present invention.

FIG. 9 is a sectional view of the second preferred embodiment of a high-density disk structured according to the present invention. The second embodiment of a high-density disk 30 according to the present invention has a clamping zone structured such that its center hole is also in asymmetric shape with respect to an imaginary longitudinal center plane c. A portion of the inner wall of the center hole is inclined at an angle θ with respect to a vertical line l. In this case, the inner diameter of the center hole decreases from bottom (the side in which the recording layer is disposed), where the inner diameter is a maximum of 15 mm, to a distance (t−d2), where the minimum inner diameter is equal to [15 mm−2(D2)], as shown in FIG. 9. The distance "d2" is a depth of the center hole where the inner diameter is constant. The horizontal distance "D2" is equal to [(t−d2)(tanθ)]. The center hole of the present disk 30 at the top (opposite to the side in which the recording layer is disposed) has better durability since the there is less likelihood that the top edge of the center hole will chip or erode than in the case of the first embodiment. This is due to the vertical surface provided by the depth d2.

The inclined angle θ in this embodiment preferably ranges from 30 to 60 degrees. The spindle 11 of the turntable in a disk device, which the HD-DVD 30 is placed onto, is structured such that its outer wall is also inclined at the same angle θ as shown in FIG. 9.

Figure 10:
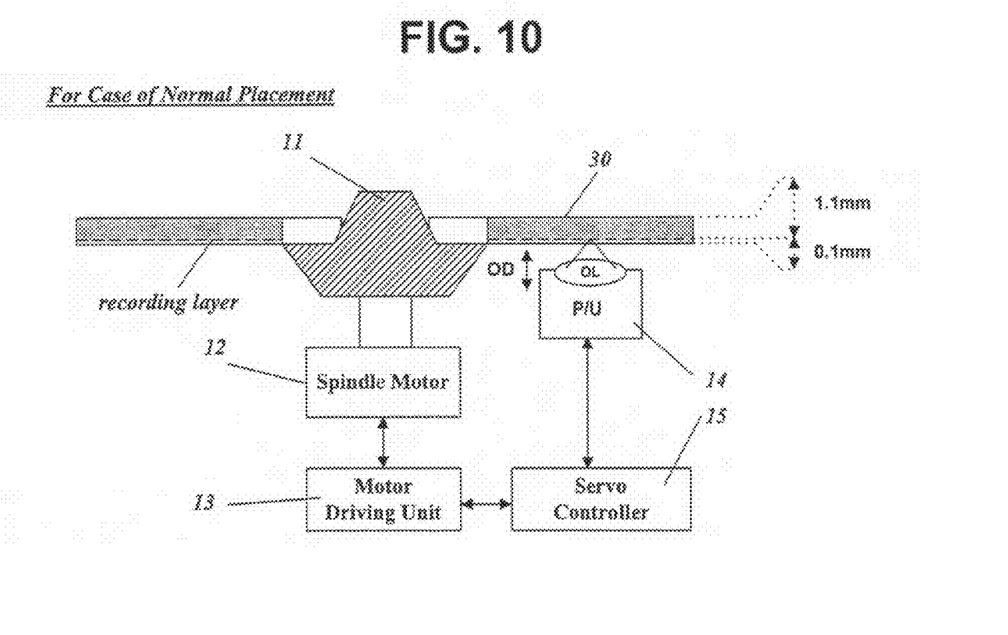
FIGS. 10 and 11 show normal placement and misplacement, respectively, of the second embodiment of a high-density disk structured according to the present invention.

If the disk 30 structured as above is placed normally onto the spindle 11 of a turntable in a disk device as shown in FIG. 10, the spindle 11 with an inclined outer wall of the turntable is in uniform contact with the center hole throughout the distance (t−d2), where the inner wall of the center hole is inclined. Consequently, the disk 30 is normally clamped the same as a conventional disk.

After successful clamping of the high-density disk 30, a conventional servo-controlling operation, characterized by the operation of the turntable motor 12, the motor driving unit 13 and the servo controller 15, is conducted to rotate the right-clamped disk 30 at a constant and high speed. Subsequently, a focusing-servo operation is conducted to focus a laser beam exactly onto a recording layer by moving the objective lens OL of the optical pickup 14 up and down within the operating distance OD. Once the laser beam is exactly focused, reproduction (or recording) of the high-density pit patterns begins.

Figure 11:
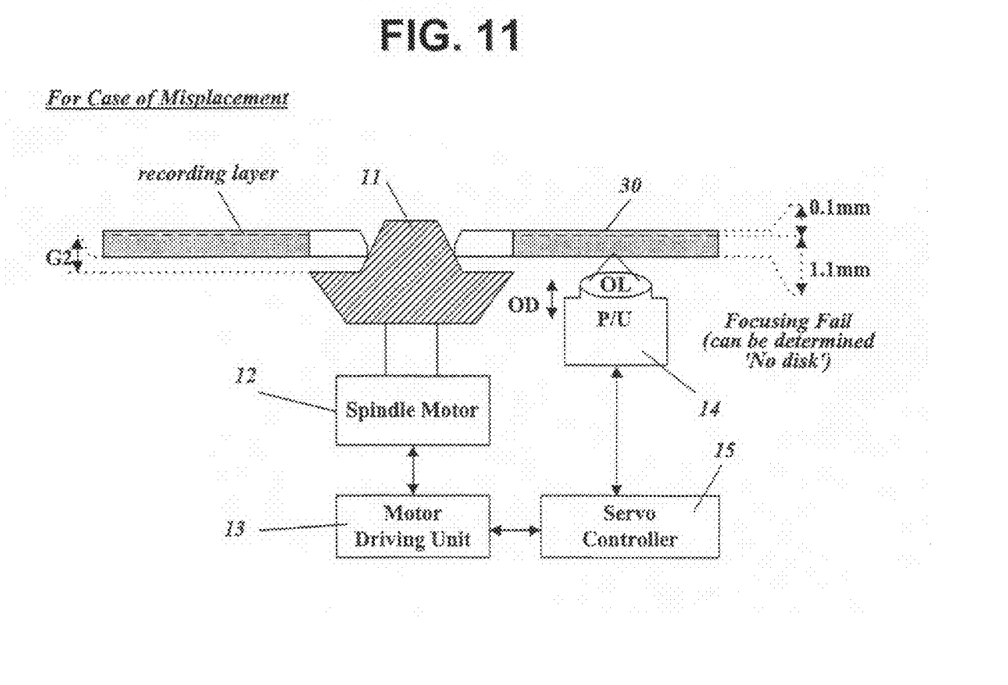

However, if the present disk 30 is placed upside down on the spindle 11 as shown in FIG. 11, contact between the spindle 11 and the disk 30 only occurs where the center hole of the disk 30 is of the smallest diameter, [15 mm−2(D2)]. The disk 30 is therefore supported by the spindle 11 at about middle height of the spindle 11. In other words, there is no uniform contact between the spindle 11 and the disk 20 throughout the thickness (t−d2) of the disk 30 since the spindle 11 is not fully inserted into the center hole of the present disk 30. Consequently, the surface of the disk 30 is raised by the gap G2 over normal placement. The gap G2 is shorter than the gap G1 created by the misplaced disk 20 of the first embodiment.

Therefore, although the objective lens OL of the optical pickup 14 moves up to the maximum distance to acquire the exact focus while the misplaced disk 30 is rotating at a high speed, the objective lens OL will not collide with the surface of the misplaced disk 30 due to the marginal gap G2. This is similar to the case shown in FIG. 8 of the first embodiment. Furthermore, because the recording layer, and the high-density pit patterns contained within, is also further apart from the objective lens OL than in normal placement, the focusing operation will fail. As a result, the misplacement of the disk would be judged as "no disk". Because a judgment of "no disk" ceases the focusing operation, a collision between the objective lens OL and the disk 30 is avoided.

Figure 12:
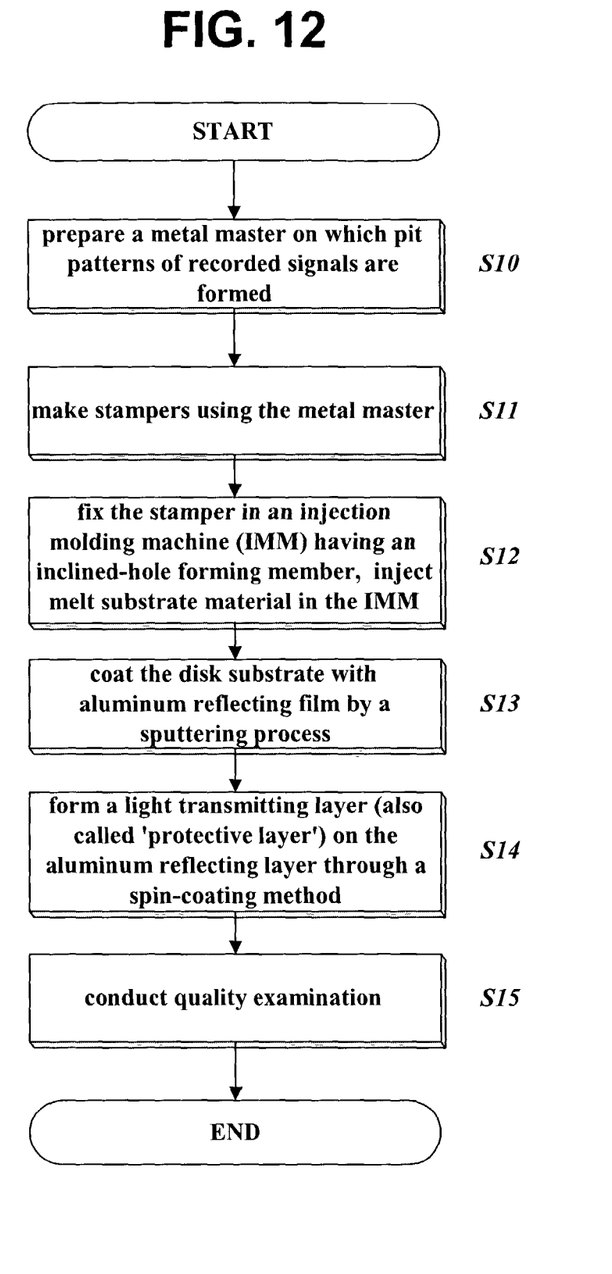
FIG. 12 shows a disk manufacturing process of a high-density disk structured according to the present invention.
Figure 13:
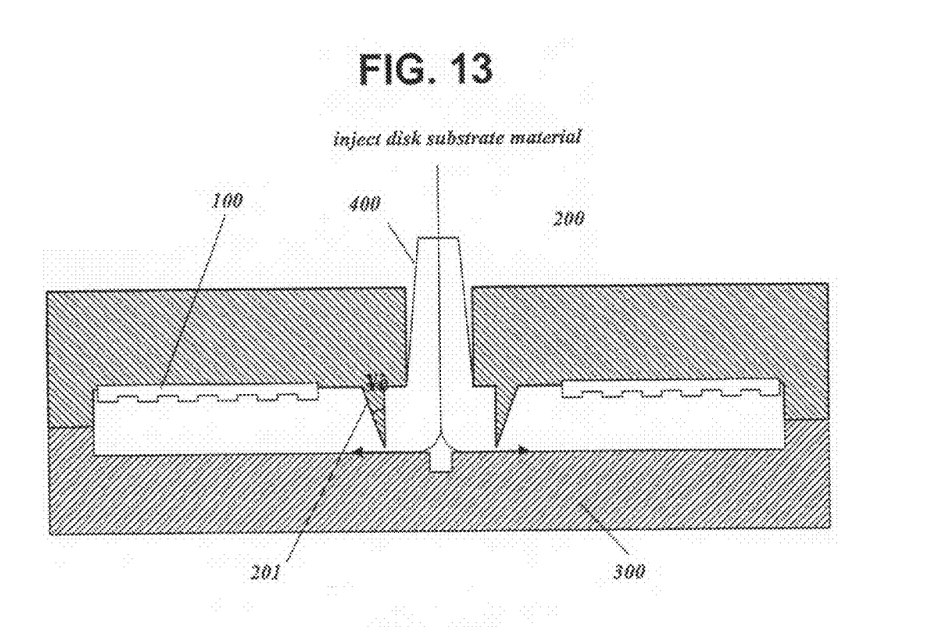
FIG. 13 is a sectional view of a disk injection and molding machine to manufacture a high-density disk structured according to the present invention.

FIGS. 12 and 13 illustrate a method of manufacturing a high-density disk which has a center hole with an inclined inner wall. FIG. 12 shows a disk manufacturing process in accordance with the present invention. According to the disk manufacturing process of FIG. 12, a metal master is obtained through a mastering process (S10). The metal master is developed from an electroplated glass master on which pit patterns of recorded signals are formed. Several stampers are made from the metal master (S11). The pit patterns reflecting recorded signals formed on the metal master are copied inversely onto the surface of each stamper.

Referring to FIG. 13, a stamper 100 is fixed firmly to the bottom of a top plate 200 of an injection molding machine (IMM). A bottom plate 300 of the IMM is tightly combined upward with the top plate 200. Afterwards, substrate material such as melted polycarbonate resin is injected at high temperature into the IMM through a port 400. Then, a disk substrate having right pit patterns is produced from the fixed stamper 100 situated in the IMM (S12).

The bottom center of the top plate 200 of the IMM has a hollow cylinder 201, which has an outer wall that is inclined at the angle θ, in order to produce a high-intensity disk with a center hole with a θ-inclined inner wall. The part on the produced disk substrate (having the same circumference as the port 400) formed by the hollow cylinder 201 is cut out vertically to form the center hole of a high-density disk.

Next, pit pattern side of the disk substrate is coated with aluminum reflecting film by a sputtering process in which aluminum metal ions are sputtered and stuck onto the substrate (S13). A light transmitting layer (also called "protective layer") is then formed on the aluminum reflecting layer by means well known to one of ordinary skill in the art, such as through a spin-coating method or a film bonding method (S14).

For example, in a spin-coating method, a UV bonding material such as UV resin is deposited onto the central part of the disk substrate rotating at a high speed. The high-speed rotation creates a centrifugal force, instantly and uniformly spreading the UV bonding material over the reflecting layer. Additionally, the UV bonding material is cured by irradiating ultraviolet rays thereon.

An opposite disk plate is then bonded with the resulting disk substrate, which finally yields a high-density disk containing a center hole that has θ-inclined inner wall. Finally, various quality control tests such as determining light reflecting rate etc. of a high-density disk manufactured as above are performed (S15) to ensure acceptability.

Figure 14:
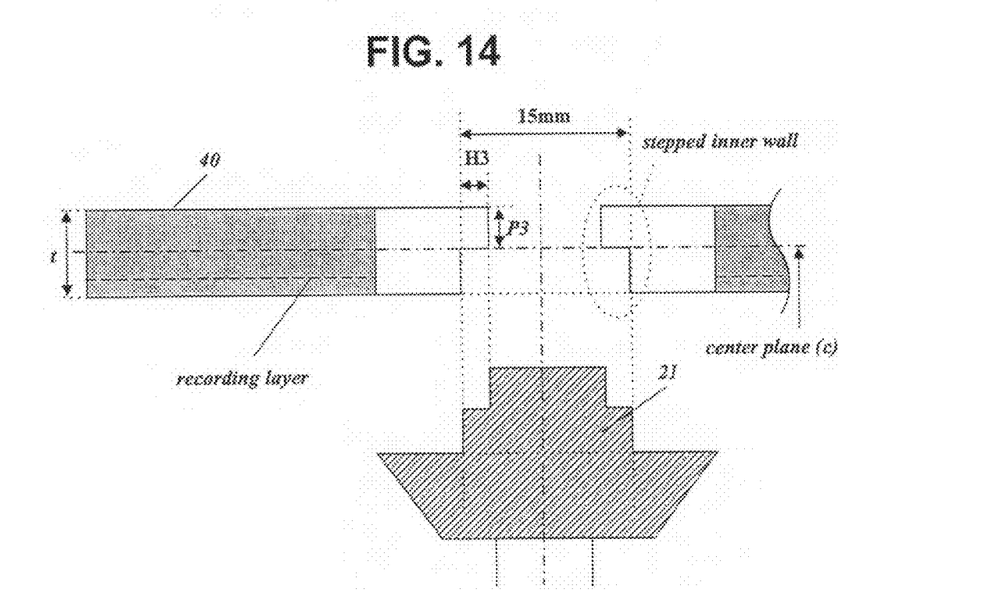
FIG. 14 is a sectional view of the third embodiment of, for example, a high-density disk structured according to the present invention.
Figure 15A:
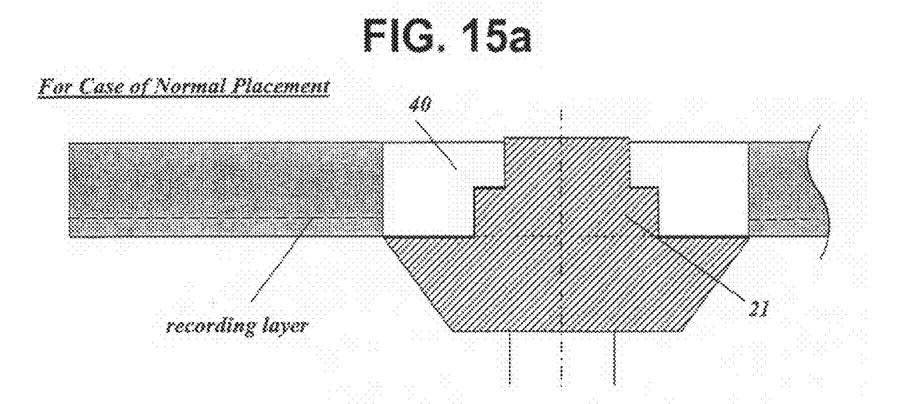
FIGS. 15a to 15c show normal placement and misplacement of the third embodiment of a high-density disk structured according to the present invention, and placement of a conventional CD or DVD onto a turntable structured according to the purpose of the present invention.
Figure 15B:
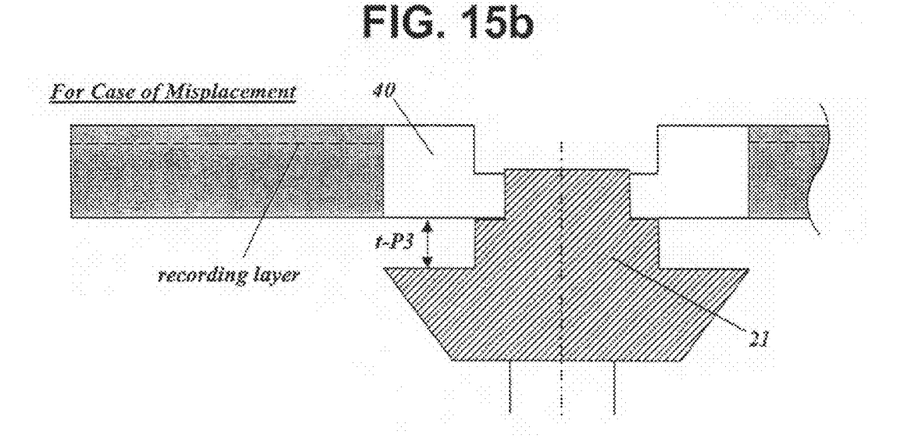
Figure 15C:
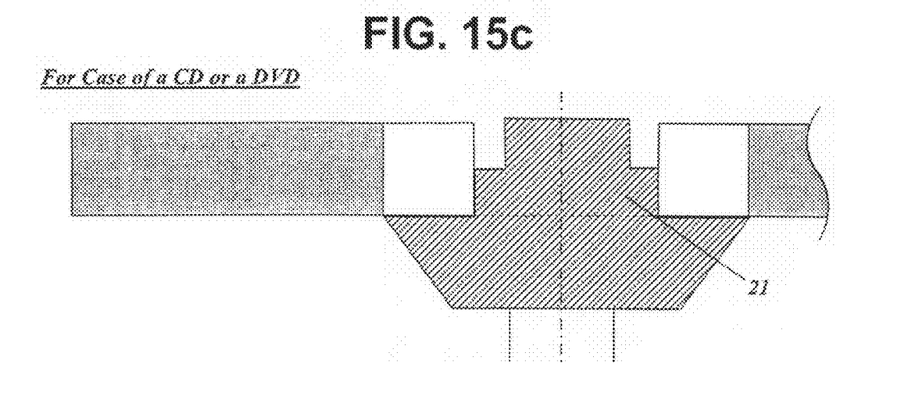

FIG. 14 is a sectional view of the third preferred embodiment of a high-density disk structured according to the present invention. FIGS. 15a to 15c show normal placement and misplacement of the present disk 40 of FIG. 14, and placement of a CD or a DVD placed onto a turntable with a spindle 21 that is structured to accept a high-density disk of the third embodiment, respectively.

The third embodiment of a high-density disk 40 according to the present invention has a clamping zone structured such that its center hole is in asymmetric shape with respect to an imaginary longitudinal center plane c. In this case, the center hole encircled by the clamping zone is stepped inwards by a distance H3 at a depth P3. The distance H3 is equal to the difference between the maximum and minimum inner diameters and the distance P3 is the depth from top (opposite to the side in which the recording layer is disposed). The spindle 21 of the turntable that is equipped in a disk device and which the HD-DVD 40 is placed onto is structured such that its outer wall is stepped in order to correspond to the center hole with the stepped inner wall.

If the disk 40 structured as above is placed normally on a spindle or turntable 21 equipped in a disk device as shown in FIG. 15a, the spindle 21 with the stepped outer wall is exactly fitted to the center hole with the stepped inner wall to produce uniform contact between the spindle 21 and the disk 40. Consequently, the disk 40 is normally clamped the same as a conventional disk. However, if the disk 40 is misplaced upside down as shown in FIG. 15b, the minimum inner diameter of the disk 40, which the spindle 21 encounters first upon the misplacement of the disk 40, prevents complete and uniform contact between the spindle 21 and the inner wall of the center hole of the disk 40. This prevention occurs because the disk 40 is now situated on the step located on the spindle 21. Consequently the surface of the disk 40 is raised by the height (t−P3) over normal placement where t is thickness of the disk 40.

In this case where the disk 40 is raised by a distance (t−P3) over the resting plate of the spindle 21, the objective lens OL will not collide with the surface of the misplaced disk 40, due to the marginal gap (t−P3) when the objective lens OL of the optical pickup 14 moves up to the maximum distance to acquire the exact focus while the misplaced disk 40 is rotating at a high speed. Furthermore, because the recording layer, and the high-density pit patterns contained within, is also further apart from the objective lens OL than in normal placement, the focusing operation will fail. As a result, the misplacement of the disk-would be judged as "no disk". Because a judgment of "no disk" ceases the focusing operation, a collision between the objective lens OL and the disk 40 is avoided.

A conventional CD or DVD can be placed and clamped at the turntable 21 with the rotating axis having the stepped outer wall, as shown in FIG. 15c, since the diameter of the center hole of a conventional CD or DVD is constant throughout its thickness.

In addition, the disk structures of the above embodiments are applicable to a different sized disk including a mini disk with 80 mm in diameter, besides a high-density disk of 120 mm diameter. Furthermore, the center hole of the high-density disk may be shaped variously other than the aforementioned embodiments.

The invention may be applicable to a rewritable high-density disk as well as a read-only high-density disk without departing from the spirit or essential characteristics thereof. Alternatively, the present invention may also be applied to any other rewritable or read-only type disk medium. It will be apparent to those skilled in the art that various modifications and variations can be made in the present invention without departing from the spirit or scope of the invention. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium for storing data comprising:
    a recording area having first and second surfaces;
    a clamping area;
    a center hole having a first and second inner diameter, and an inner wall having a length, wherein the center hole is asymmetrically shaped with respect to a coplanar center plane of the recording medium and the inner wall of the center hole is inclined at an angle; and
    a recording layer disposed in the recording area, wherein the recording layer is in closer proximity to the second surface of the recording area.

2. The recording medium of claim 1, wherein the first inner diameter is less than the second inner diameter.

3. The recording medium of claim 2, wherein the first inner diameter is less than 15 mm and the second inner diameter is approximately 15 mm.

4. The recording medium of claim 2, wherein the second inner diameter is equal to the sum of the first inner diameter and the product of 2 multiplied by the length of the inner wall multiplied by the tangent of the angle of inclination.

5. The recording medium of claim 1, wherein the angle of inclination is about 30 to 60 degrees.

6. The recording medium of claim 1, wherein a portion of the inner wall having a length closer in proximity to the second surface is inclined at an angle towards the center of the center hole and the remaining portion is parallel to a plane perpendicular to the plane of the recording medium.

7. The recording medium of claim 6, wherein the first inner diameter is less than the second inner diameter.

8. The recording medium of claim 7, wherein the first inner diameter is less than 15 mm and the second inner diameter is approximately 15 mm.

9. The recording medium of claim 6, wherein the portion of the inner wall of the center hole closer in proximity to the second surface is inclined at an angle such that the second inner diameter is equal to the sum of the first inner diameter and the product of 2 multiplied by the length of the inclined portion of the inner wall multiplied by the tangent of the angle of inclination.

10. The recording medium of claim 9, wherein the angle of inclination is about 30 to 60 degrees.

11. The recording medium of claim 1, wherein a portion of the inner wall is inclined at an angle.

12. The recording medium of claim 1, wherein the entire inner wall is inclined at an angle.

13. The recording medium of claim 1, wherein the camping area comprises an upper area and a lower area, the lower area in closer proximity to the second surface of the recording area.

14. A recording and/or reproduction apparatus for use with a recording medium, the apparatus comprising:
   a spindle with a surface having upper and lower diameters to provide support for the recording medium;
   the recording medium comprising:
   a recording area having first and second surfaces;
   a clamping area; a center hole having first and second inner diameters, and an inner wall having a length, wherein the center hole is asymmetrically shaped with respect to a coplanar center plane of the recording medium such that the recording medium is raised from the spindle when the recording medium is inserted by placing the first surface of the recording medium onto the spindle and the inner wall of the center hole is inclined at an angle; and
   a recording layer disposed in the recording area, wherein the recording layer is in closer proximity to the second surface of the recording area.

15. The apparatus of claim 14, wherein the surface of the spindle is inclined at an angle so that the upper diameter is less than the lower diameter.

16. The apparatus of claim 15, wherein the angle of inclination is about 30 to 60 degrees.

17. The apparatus of claim 14, wherein the lower diameter of the spindle is approximately 15 mm.

18. The apparatus of claim 14, further comprising:
   a spindle motor to rotate the spindle;
   a optical pickup unit to one of record and read data to be one of recorded to and read from the recording layer; and
   a serve controller to control the optical pickup.

19. The apparatus of claim 18, wherein the pickup unit includes an objective lens, the objective lens moved to a distance to acquire an exact focus, wherein the objective lens does not collide with the first surface when the recording medium is placed upside down onto the spindle even thought the objective lens is moved a maximum distance in the vertical direction to focus the recording layer.

20. A recording medium, comprising:
   a recording area having first and second surfaces;
   a clamping area;
   a center hole having a first diameter at the first surface of the recording area and a second diameter at the second surface of the recording area, the first diameter less than the second diameter, and an inner wall of the center hole inclined at an angle with respect to a vertical line; and
   a recording layer disposed in closer proximity to the second surface of the recording area.

21. The recording medium of claim 20, wherein the first diameter is less than 15 mm and the second diameter is approximately 15 mm.

22. The recording medium of claim 20, wherein the first diameter is equal to the second diameter minus (2×D1), where D1=t(tanθ), t is the thickness of the recording medium and θ is the angle of inclination of the inner wall of the center hole.

23. The recording medium of claim 20, wherein the angle of inclination of the center hole is about 30 to 60 degrees.

24. The recording medium of claim 20, wherein a portion of the inner wall having a length closer in proximity to the second surface is inclined at an angle towards the center of the center hole and the remaining portion is parallel to a plane perpendicular to the plane of the recording medium.

25. The recording medium of claim 24, wherein the first inner diameter is less than the second inner diameter.

26. The recording medium of claim 20, wherein
   an inner diameter of the center hole decreases from the bottom to a distance (t-t2), where the first diameter is equal to the second diameter minus (2×D2), t2 is the depth of the center hole where the inner diameter is constant, D2 is equal to (t-t2)(tanθ), t is the thickness of the recording medium and θ is the angle of inclination of the inner wall of the center hole.

* * * * *